United States Patent Office 3,049,236
Patented Aug. 14, 1962

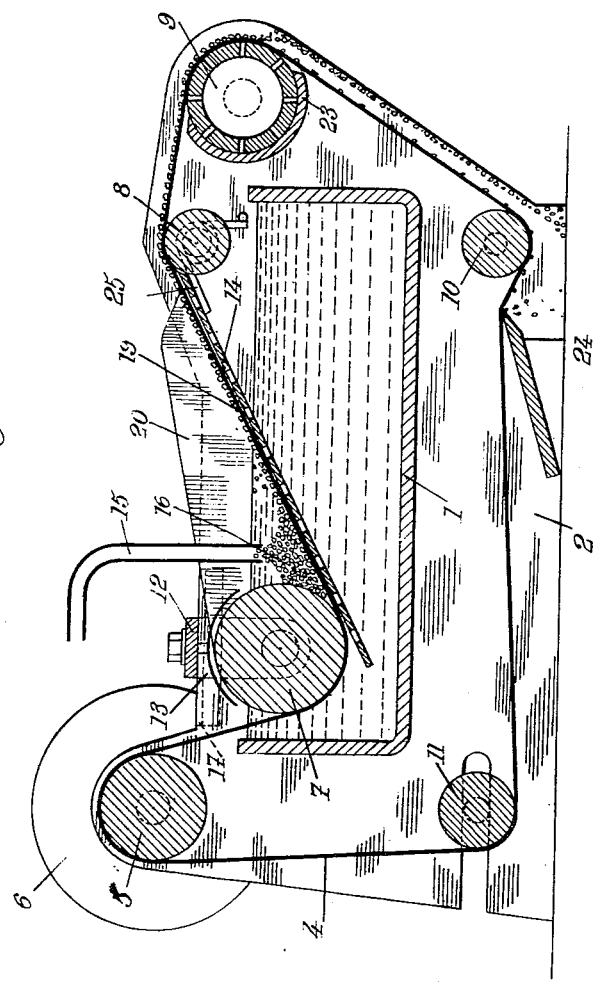

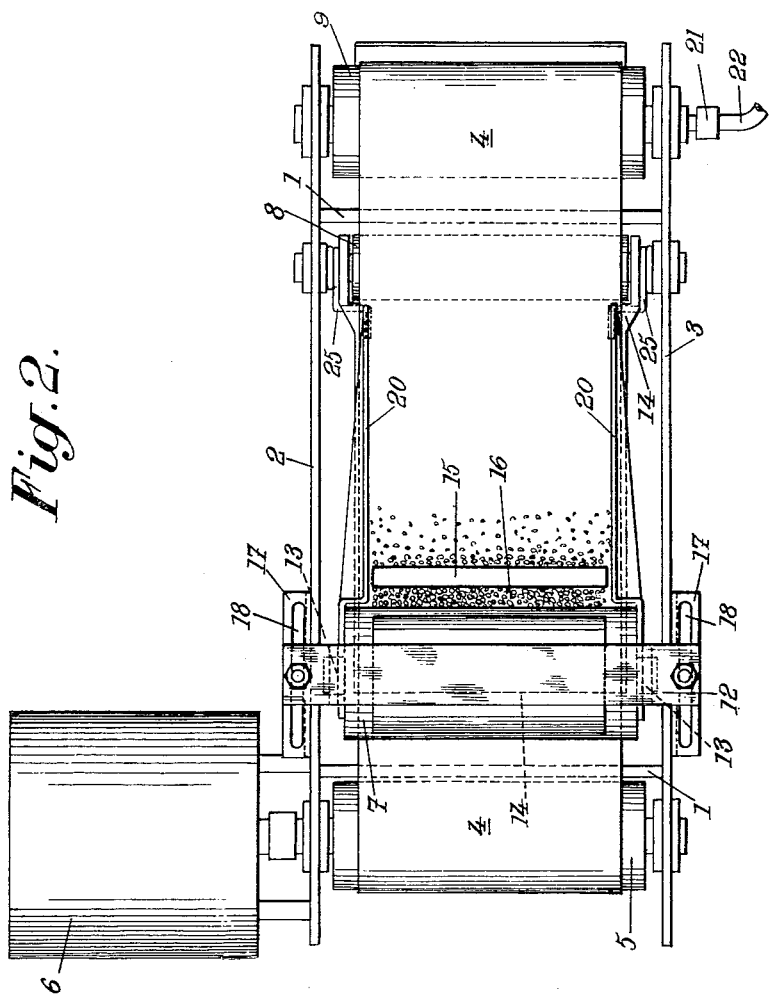

3,049,236
METHODS FOR SEPARATING A GRANULAR
MATERIAL FROM A LIQUID
Georges Cohen de Lara and Michel Louis Delachanal, Grenoble, and Roger Platzer, Chatillon-sous-Bagneux, France, assignors to Commissariat a l'Energie Atomique, Paris, France, a state administration
Filed Apr. 9, 1958, Ser. No. 727,309
Claims priority, application France Apr. 12, 1957
2 Claims. (Cl. 210—68)

The present invention relates to methods for separating a granular material from a liquid of a density lower than that of said granular material.

The object of our invention is to make it possible to obtain a uniform and regular supply of the separated granular material, in particular in order to feed it continuously to another apparatus.

For this purpose, according to our invention, the mixture to be treated is fed above a portion of a conveyor belt while said belt is given a continuous upward movement, said belt portion being immersed in a bath of said liquid and being given, at least in the zone immediately below the surface of said bath, a slope just a little smaller than the angle of repose, in said liquid, of the loose material constituted by a heap of said grains, the succession of grains carried along by said band being supported by an accumulation of grains at the lower end of said zone.

In order to separate a granular material from a liquid with which it is mixed, it has already been proposed to make use of conveyor belts partly immersed in a bath of this liquid, but such methods do not permit of obtaining a continuous and regular separation of the grains, the conveyor belt collecting said grains in the form of batches of grains agglomerated together and distributed in an irregular fashion.

Now, for some applications, it is necessary to ensure a continuous feed of the separated grains, in particular in chemical treatments where the amount of granular material is to be measured very accurately.

The particular slope which is given to the conveyor belt according to the invention makes it possible directly to obtain a continuous and regular feed of the separated material. This result is obtained in the following manner.

Among the grains heaped up on the lower portion of the conveyor belt, those in direct contact with said belt are driven by it and the grains fed immediately after them come by gravity into the spaces thus cleared. Although the slope of the belt is close to the angle of repose of the loose material constituted by a heap of said grains in the liquid, a rearward movement of the grains driven by the belt cannot take place because the last grains that have left the heap are supported by those who take their place. The uniform layer thus formed is therefore constantly supported by the heap of grains immersed in the bath. This uniform layer carried by the belt moves regularly with it and is driven to the outside of the bath.

On the contrary, the grains which, either separately or in batches, are driven by the above mentioned uniform layer and above it along the path of travel of the belt in the bath, cannot move beyond the surface of said bath.

This is due to the fact that, since the slope of the belt is close to the above defined angle of repose, a very small force applied on said last mentioned grains will be sufficient to cause them to roll down toward the heap immersed in the liquid.

This small force is supplied by the combined effects of the surface tension of the liquid and of the convection currents created in the bath by the displacements of the belt. The surface tension of the liquid plays an important part in the case of materials of small dimensions and it is necessary to give the belt a low speed of displacement in order to prevent the grains of the uniform layer formed on the belt (especially when their density is but little higher than that of the liquid) from being brought in suspension in the liquid by the convection currents and thus returned to the lower portion of the belt. In the case of grains of large dimensions, the effect of the surface tension may be considered as negligible and the desired result is obtained by a suitable choice of the speed of the belt i.e. by increasing the convection currents.

If it is a desired to obtain a partial drying of the separated grains, the belt is advantageously caused to pass round a perforated roller in which a suction is exerted.

In order to give the belt a constant slope and to make this belt as flat as possible, it is advantageous to provide a supporting plate for guiding said belt, said plate being preferably perforated and of adjustable inclination.

A preferred embodiment of this invention will be hereinafter described with reference to the accompanying drawings, given merely by way of example and in which:

FIG. 1 is a vertical section of an apparatus according to our invention.

FIG. 2 is a plane view corresponding to FIG. 1.

The apparatus illustrated by the drawings includes a tank 1 containing the liquid which forms the bath. The side walls 2 and 3 (FIG. 2) of said tank belong to the frame of the apparatus. An endless conveyor belt 4 is actuated by a driving roller 5, itself driven by an electric motor 6. Belt 4 passes successively, as shown by FIG. 1, round a partly immersed roller 7, a first guiding roller 8, a drying roller 9, a second guiding roller 10 and a tensioning roller 11.

The axes of rollers 5, 8, 9, 10 and 11 are parallel to each other and mounted on the walls 2 and 3 of tank 1. Roller 7 is carried by the two vertical side plates 13 of a support 12.

A perforated guiding plate 14 pivoted about the axis of roller 8 is provided under the portion of belt 4 passing between rollers 7 and 8. This plate 14 is urged upwardly by spring 25. It serves to keep belt 4 as flat as possible and at the desired slope.

In the example illustrated by the drawings, the material to be separated is constituted by grains of an ion exchanging resin collected in an aqueous solution at the bzottom of a treatment apparatus, for instance for recycling purposes.

These grains contained in the aqueous solution are fed through a conduit 15 which opens into the bath above belt 4 and close to roller 7 against which the grains form a heap 16.

The grains are of substantially spherical shape and their mean diameter is 0.7 mm. and their density 1.2

The belt is made of a cotton fabric permeable to water and its slope in the separation zone ranges from 26° to 27°, being smaller by some degrees than the angle of repose of the granular material constituted by the resin in the aqueous solution, which angle ranges from 28° to 31°.

The speed of displacement of the belt is about 4 or 5 millimeters per second.

FIG. 2 shows that the walls 2 and 3 of the tank are integral with two extensions 17 provided with elongated slots 18 in which support 12 is slidable and can be fixed in position by means of bolts and nuts. This arrangement makes it possible to modify the distance between rollers 7 and 8 and therefore the slope of the portion of belt 4 travelling between said rollers. Of course this adjustment must be accompanied by a corresponding displacement of tensioning roller 11 (FIG. 1) so as to maintain a correct tension of the belt.

The belt drives the grains, in a regular fashion, from the bottom of heap 16. During their travel in the liquid, these grains, which are supported by one another and therefore form a succession bearing upon heap 16, form a regular layer 19. On the contrary, the grains located above this layer are distributed in an irregular fashion and their position is little stable since, according to the invention, the portion of belt 4 between rollers 7 and 8 has a slope just little smaller than that of the angle of repose of the grains in the liquid. Before they have been able to pass through the surface of the bath, these grains are returned toward the heap 16 under the combined effects of the convection currents created in the bath by the movements of the belt and of the surface tension forces. Only the layer 19 of grains is allowed to emerge from the bath.

In order to prevent the grains of material from overflowing from the sides of the belt, between rollers 7 and 8, two guiding plates 20 pivoted about the axis of roller 7 are disposed along the edges of the belt which they contact without impairing its movement.

The hollow drying roller 9, provided with a multiplicity of holes, is connected at one of its ends through a rotating joint 21 and a tube 22 (FIG. 2) with an apparatus (not shown) for exerting a suction in said roller. A semi-cylindrical fixed wall 23 (FIG. 1) is mounted concentrically to roller 9 over the portion thereof which is not in contact with the conveyor belt.

Some grains partly dried on roller 9, but still moist, may keep sticking to the belt. Therefore a scraper 24 has been provided close to guiding roller 10.

In a general manner, while we have in the above description disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. A method of removing a granular material consisting of an ion-exchange resin from a liquid of a density lower than that of said resin with which it is mixed which comprises feeding a mixture of the granular material and liquid to a conveyor belt partially immersed in a stationary bath of liquid below the surface of the liquid in said bath, accumulating the grains of said granular material in a heap on said conveyor belt below said liquid surface, moving the separated granular material on said conveyor belt in a single layer formation to the outside of said bath by advancing said conveyor belt upwardly through said bath at an angle slightly smaller than the angle of repose of said heap of granular material in the liquid bath, and partially supporting said single layer by the heap of grains continuously accumulating on said conveyor belt where said mixture is fed upon the belt, said conveyor belt being advanced at a rate maintaining said single layer formation on the belt when it emerges from inside the bath to the outside.

2. A method according to claim 1, which further comprises drying the portion of the belt covered with grains as it has just emerged from said bath.

References Cited in the file of this patent

UNITED STATES PATENTS

| | | |
|---|---|---|
| 392,606 | Heywood | Nov. 13, 1888 |
| 996,877 | Nichols | July 4, 1911 |
| 1,028,823 | Horrell et al. | June 4, 1912 |
| 1,472,574 | Wright et al. | Oct. 30, 1923 |
| 2,831,518 | Buck | Apr. 22, 1958 |

FOREIGN PATENTS

| | | |
|---|---|---|
| 26,055 | Finland | Sept. 30, 1953 |
| 122,493 | Germany | July 29, 1901 |